US009562206B2

(12) United States Patent
Cannella et al.

(10) Patent No.: US 9,562,206 B2
(45) Date of Patent: Feb. 7, 2017

(54) METHOD FOR INCREASING THE HIGH LOAD (KNOCK) LIMIT OF AN INTERNAL COMBUSTION ENGINE OPERATED IN A LOW TEMPERATURE COMBUSTION MODE

(71) Applicants: William James Cannella, San Ramon, CA (US); Amir Gamal Maria, San Ramon, CA (US); John E. Dec, Livermore, CA (US); Chunsheng Ji, Livermore, CA (US)

(72) Inventors: William James Cannella, San Ramon, CA (US); Amir Gamal Maria, San Ramon, CA (US); John E. Dec, Livermore, CA (US); Chunsheng Ji, Livermore, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/891,696

(22) Filed: May 10, 2013

(65) Prior Publication Data
US 2014/0331953 A1  Nov. 13, 2014

(51) Int. Cl.
| | |
|---|---|
| *C10L 10/12* | (2006.01) |
| *C10L 1/10* | (2006.01) |
| *C10L 1/18* | (2006.01) |
| *C10L 1/23* | (2006.01) |
| *F02D 41/30* | (2006.01) |
| *F02B 1/12* | (2006.01) |
| *F02D 19/08* | (2006.01) |

(52) U.S. Cl.
CPC .............. *C10L 10/12* (2013.01); *C10L 1/10* (2013.01); *C10L 1/1811* (2013.01); *C10L 1/23* (2013.01); *C10L 2270/023* (2013.01); *F02B 1/12* (2013.01); *F02D 19/084* (2013.01); *F02D 41/3035* (2013.01); *Y02T 10/36* (2013.01)

(58) Field of Classification Search
CPC ............. F02B 1/14; F02B 1/12; F02D 19/084; F02D 41/3035; C10L 1/10; C10L 1/1811; C10L 1/23; C10L 10/12
USPC ....................................................... 123/1 A
See application file for complete search history.

(56) References Cited

U.S. PATENT DOCUMENTS

| | | | | |
|---|---|---|---|---|
| 6,662,760 | B1 * | 12/2003 | Stanglmaier et al. | ............ 123/3 |
| 8,722,947 | B2 * | 5/2014 | Sugano | ............ 585/14 |
| 2004/0111957 | A1 * | 6/2004 | Filippini et al. | ................. 44/351 |
| 2006/0185644 | A1 * | 8/2006 | Hashimoto et al. | .......... 123/295 |
| 2011/0271925 | A1 | 11/2011 | Cannella et al. | |
| 2012/0012087 | A1 | 1/2012 | Cannella et al. | |
| 2012/0260877 | A1 * | 10/2012 | Peyla et al. | .................... 123/1 A |

FOREIGN PATENT DOCUMENTS

| | | | |
|---|---|---|---|
| GB | WO 2008071628 A1 * | 6/2008 | ............. C10L 1/231 |
| WO | 2008/071628 A1 | 6/2008 | |

OTHER PUBLICATIONS

Eng, et al. "The Effect of Di-Tertiary Butyl Peroxide (DTBP) Addition to Gasoline on HCCI Combustion", SAE Technical, Paper 2003-01-3170 (2003).
Hanson, et al. "Fuel Effects on Reactivity Controlled Compression Ignition (RCCI) Combustion at Low Load", SAE International, Paper 2011-01-0361 (2011).
Maria, et al. "Understanding Knock Metric for Controlled Auto-Ignition Engines", SAE International, Paper 2013-01-1658 (2013).
Tanaka, et al. "Two-Stage Ignition in HCCI Combustion and HCCI Control by Fuels and Additives", Combustion and Flame, vol. 132, pp. 219-239 (2003).
Yang, et al. "Boosted HCCI Combustion Using Low-Octane Gasoline with Fully Premixed and Partially Stratified Charges", SAE International J. Engines, vol. 5, Issue 3, pp. 1075-1088 (2012).
Zuo-Qin, Qian et al., "Characteristics of HCCL engine operation for additives, EGR, and intake charge temperature while using iso-octane as a fuel", Journal of Zhejiang University Science A; An International Applied Physics & Engineering Journal, Springer, Berlin, DE, vol. 7, No. 2, pp. 252-258 (2006).
Xiaohiu, Gong et al., "Effects of DTBP on the HCCL Combustion Characteristics of SI Primary Reference Fuels", SAE Technical Paper Series, Society of Automotive Engineers, Warrendale, PA, US, vol. 2005-01-3740, pp. 12 (2005).
Kaddatz J. et al., "Light-Duty Reactivity Controlled Compression Ignition Combustion Using a Cetane Improver", SAE Technical Paper Series, Society of Automotive Engineers, Warrendale, PA, US, vol. 2012-01-1110, pp. 119-134 (2012).
Zingcai Lu et al., "The effects of external exhaust gas reciruclation and cetane number improver on the gasoline homogenous charge compression ignition engines", Combustion Science and Technology, Gordon and Breach Science Publishers, New York, NY, US, vol. 178, No. 7, pp. 1237-1249 (2006).

* cited by examiner

*Primary Examiner* — Jacob Amick
(74) *Attorney, Agent, or Firm* — Ryan, Mason & Lewis, LLP

(57) ABSTRACT

Disclosed herein is a method for increasing the high load (knock) limit of an internal combustion engine operated in a low temperature combustion ignition mode, the method comprising operating the engine with a fuel composition comprising (a) gasoline having a Research Octane Number (RON) greater than 85 and (b) one or more cetane improvers.

27 Claims, 4 Drawing Sheets

METHOD FOR INCREASING THE HIGH LOAD (KNOCK) LIMIT OF AN INTERNAL COMBUSTION ENGINE OPERATED IN A LOW TEMPERATURE COMBUSTION MODE

GOVERNMENT LICENSE RIGHTS

The Government has rights in this invention pursuant to Funds-In Agreement No. 083060511.

BACKGROUND OF THE INVENTION

1. Technical Field

The present invention is directed to a method for increasing the high load (knock) limit of an internal combustion engine operated in a low temperature combustion mode such as a homogeneous charge compression ignition mode.

2. Description of the Related Art

Internal combustion engines, including diesel engines, gasoline engines, gaseous fuel-powered engines, and other engines known in the art exhaust a complex mixture of air pollutants. Internal combustion engines, especially automotive internal combustion engines, generally fall into one of two categories, spark ignition engines and compression ignition engines. Traditional spark ignition engines, such as gasoline engines, typically function by introducing a fuel/air mixture into the combustion cylinders, which is then compressed in the compression stroke and ignited by a spark plug. Traditional compression ignition engines, such as diesel engines, typically function by introducing or injecting pressurized fuel into a combustion cylinder near top dead center (TDC) of the compression stroke. Traditional gasoline engine combustion results in a premixed turbulent flame, while traditional diesel engine combustion results in a mixing controlled diffusion flame. Both processes are controlled by fluid mechanics, as well as heat and mass transfer. Each type of engine has advantages and disadvantages. In general, gasoline engines coupled with 3-way emissions catalysts produce fewer emissions but are less efficient, while, in general, diesel engines are more efficient but produce more emissions.

These air pollutants are composed of particulates and gaseous compounds including, among other things, oxides of nitrogen ($NO_x$). Continued global emphasis and government legislation on reducing emissions and improving fuel economy of internal combustion engines has led to the need to develop advanced high efficiency, clean combustion engines. Exhaust after-treatment systems (such as Selective Catalyst Reduction (SCR), lean $NO_x$ traps, and diesel particulate filters) have been designed and commercialized to lower exhaust emissions of diesel engines to meet emission targets and regulations. However, these systems are costly, add to the weight of the vehicle, increase exhaust back pressure and minimize fuel economy due to the added weight and the need to use fuel to regenerate the systems. Reducing engine-out emissions would decrease the size and/or eliminate the need for these systems.

One approach explored in the industry to simultaneously reduce emissions (compared to a traditional diesel engine) and improve efficiency (compared to a traditional gasoline engine) is to operate the engine at a lower combustion temperature (typically called "low temperature combustion" (LTC)). This can be achieved by premixing some or all of the fuel with air (and optionally recycled exhaust gas), either prior to entering the cylinder, or alternatively in the cylinder well before combustion occurs. This, in turn, greatly reduces (or eliminates) the fraction of fuel that is burned with a mixing controlled diffusion flame (diffusion flames lead to high combustion temperatures). Also, the ratio of the fuel to the total mass in the cylinder is kept low to ensure low temperature combustion. This greatly reduces the effectiveness of a spark plug. As a result, ignition is normally initiated via compression; however, a spark plug can be used to assist. The low temperature after combustion significantly reduces $NO_x$ formation due to the fundamental chemistry of the reaction pathway. The use of fuels with gasoline-type volatilities (vs. heavier fuels such as diesel), combined with premixing the fuel and air limits soot production. There are several types of LTC each of which has a distinct acronym, for example: HCCI, PCCI, CAI, PPC, RCCI, MK, UNIBUS, OKP, and the like.

One drawback to these LTC-type technologies is that the speed-load (speed-power output) operating range is very limited, and significantly smaller than required and provided by current gasoline spark-ignited and diesel compression ignition internal combustion engines. Moreover, the high load limits which are typically limited by engine-knocking are especially lower than in conventional engines.

Homogeneous charge compression ignition ("HCCI") is an attractive advanced combustion process that offers potential as a high-efficiency alternative to conventional spark ignition and compression ignition engines. The operating principle of HCCI engines combines characteristics of spark ignition and diesel engines. The primary mechanism that limits the load (power) output from LTC engines, especially HCCI engines, is combustion noise (i.e., knocking/ringing) which can potentially damage the engine and is due to excessive pressure rise rates (PRR). A large PRR is a direct result of the charge homogeneity: ignition happens everywhere in the cylinder almost simultaneously, unlike in a spark ignition engine where it is limited by flame propagation rates or in a diesel engine where it is limited by mixing and injection rates. Accordingly, the nature of this problem is akin to spark-ignition knock and presents a high-load knock limit to the operating range.

Ongoing R&D efforts have shown that fuel compositions and their properties can have an impact on the speed-load range that can be obtained. With diesel fuel, elevated temperatures are required before significant vaporization occurs making it difficult to form a premixed near-homogeneous charge. Diesel fuel also has significant cool-combustion chemistry leading to rapid auto-ignition once compression temperatures exceed about 800° K. This can lead to overly advanced combustion phasing and/or require reduced compression ratios that reduce engine efficiency.

At the other extreme are high octane fuels like "pump" gasoline (i.e., gasolines available in the marketplace) and isooctane which are easier to volatilize and mix with air, but which are very resistant to autoignition. Typically, they require high inlet temperatures or the addition/recycle of hot exhaust gases to initiate autoignition. As a result, charge densities are much lower than those of typical engines, and the fresh fuel/air portion of the charge is limited.

One possible solution to reduce the foregoing problems is the use of fuels having gasoline-like volatilities, but somewhat lower octane numbers than "pump" gasoline, but are more reactive. Moreover, the combustion phasing for a more reactive fuel could be retarded farther with good stability, which allows higher charge-mass fuel/air equivalence ratio (era) without knock. The combination of a higher $\phi_m$ and higher charge density from low-octane fuels has been shown to have the potential to significantly increase the high load limit compared to regular pump gasoline. Yang et. al. (SAE Int. J. Engines, Vol. 5, Issue 3, p. 1075, 2012)

demonstrate that in HCCI operation a naphtha fuel (called "Hydrobate") having a RON of 66 (and an AKI=67.5=(RON+MON)/2) provides a significantly higher load (and thus power) than gasoline having an AKI=87 and requires a much lower intake temperature. However, the low-octane gasolines are not readily available in the market.

Another approach for limiting the high pressure rise rates and subsequent knocking is to introduce some stratification so that the air and fuel are not perfectly mixed (i.e., not homogeneous). Stratification can be introduced in a number of different ways, including (1) injecting fuel and air separately and at different times so that only part of the fuel is premixed with air; (2) multiple injections of fuel some of which can mix with the air and some without and (3) injection of two fuels having different ignition characteristics. These advanced combustion approaches are different than HCCI and are known by several names including: Partially Premixed Combustion (PPC), Stratified Charge HCCI, and Dual Fuel Reactivity Controlled Compression Ignition (RCCI). Many of those approaches also seem to perform best with fuels having lower octane than pump gasoline.

For example, U.S. Patent Application Publication Number 2011/0271925 ("the '925 application") discloses fuel compositions that yield very low soot and low $NO_x$ emissions while having high efficiencies and acceptable maximum in-cylinder pressure rise rates over a wide load range when used in an advanced combustion engine environment, especially one operating in partially-premixed combustion (PPC) mode. The fuel compositions disclosed in the '925 application have a boiling range of between 95 to 440 degrees Fahrenheit, and (a) a total sum of n-paraffins and naphthenes content of at least 7 volume percent and (b) a preferred RON of about 80 or less.

Another example is U.S. Patent Application Publication Number 20120012087 ("the '087 application") which discloses fuel compositions that provide: (a) a significant reduction in $NO_x$, (b) a reduction in soot emissions, and (c) high efficiencies, especially when compared to conventional diesel fuel compositions, when the fuels of that invention are employed in a partially premixed combustion mode in an advanced combustion engine. The fuel compositions disclosed in the '087 application have a boiling range of between 95 to 440 degrees Fahrenheit, and (a) a total sum of n-paraffins and naphthenes content of at least 22 volume percent and (b) a RON of about 90 or less. The best performing fuels had a RON of 80 or less.

A significant drawback of the use of fuels such as naphthas having a lower octane than pump gasoline is that they are present in refineries in much smaller quantities than gasoline and availability for sale at fuel stations would require additional fuel storage tanks which most fuel stations do not have space for. It would therefore be more advantageous, and cost effective, if the conventional pump gasoline could also be formulated to work in these engines.

One approach is to use additives to change the reactivity of pump gasoline. Cetane improvers such as 2-ethylhexyl nitrate (EHN) and di-tert butyl peroxide (DTBP) have typically been added to diesel fuels to increase their cetane number. However, the use of cetane improvers in conventional pump gasolines is limited, particularly in HCCI processes. For example, SAE Paper 2003-01-3170 by Eng et. al. discloses the use of DTBP to lower the low load stability limit in an HCCI single cylinder engine operated with PRF85 (a mixture of 85% iso-octane and 15% n-heptane, which by definition has a RON=MON=(RON+MON)/2=85. These types of PRF's are frequently used in research to represent gasoline. However, gasoline is known to be a more complex mixture and does not always perform the same as PRF. Further, they disclose that "adding an ignition promoter to extend the lower fueling rate limit" (i.e., the low load limit) "will result in a corresponding decrease in the maximum fueling level" (i.e., the high load limit).

Another example is SAE paper 2011-01-0361 by Hanson et. al which discloses the addition of EHN to gasoline to lower the low load limit in Reactivity-Controlled Compression Ignition (RCCI). RCCI utilizes two fuels with different reactivities and multiple fuel injections (one port and the other direct injection to create some stratification) to control air-fuel mixture reactivity in engine cylinders.

Combustion and Flame publication (132, (2003), 291-239) by Tanaka et. al. added 0.5 to 2% DTBP and EHN to PRF90 (90% iso-octane+10% n-heptane) and tested fundamental combustion behavior in a rapid compression machine (not an engine). Tanaka et. al. found that the cetane improvers shortened the ignition delay time (i.e., speed up the start of combustion). In addition, Tanaka et. al. reported that DTBP is more effective than EHN and that they do not see any change in burn rate which they relate directly to knocking behavior. Thus one would not expect an increase in the high load knocking limit.

Heretofore, there has been no appreciation or recognition that the addition of one or more cetane improvers to conventional pump gasoline can increase the high load limit in an internal combustion engine operated in a low temperature combustion mode thereby increasing the knock limit of the engine when operated in a low temperature combustion mode.

SUMMARY OF THE INVENTION

In accordance with one embodiment of the present invention, there is provided a method for increasing the high load (knock) limit of an internal combustion engine operated in a low temperature combustion mode, the method comprising operating the engine with a fuel composition comprising (a) gasoline having a Research Octane Number (RON) greater than 85 and (b) one or more cetane improvers.

In accordance with a second embodiment of the present invention, there is provided a method for increasing the knock limit of an internal combustion engine operated in a premixed charge compression ignition mode, the method comprising operating the engine with a fuel composition comprising (a) gasoline having a RON greater than 85 and (b) one or more cetane improvers.

In accordance with a third embodiment of the present invention, there is provided a method for increasing the knock limit of an internal combustion engine operated in a homogeneous charge compression ignition mode, the method comprising operating the engine with a fuel composition comprising (a) gasoline having a RON greater than 85 and (b) one or more cetane improvers.

In accordance with a fourth embodiment of the present invention, there is provided the use of one or more cetane improvers for increasing the knock limit of an internal combustion engine operable in a homogeneous charge compression ignition mode, wherein the engine is operated with a fuel composition comprising gasoline having a RON greater than 85.

Among other factors, the present invention is based on the surprising discovery that the high load (knock) limit of an internal combustion engine operated in a low temperature combustion mode can be increased by operating the engine with a fuel composition comprising (a) gasoline having a RON greater than 85 and (b) one or more cetane improvers. By increasing the knock limit, the engine is able to operate with pump gasoline at the higher loads that are encountered during the driving cycle. If those high loads cannot be achieved, then an internal combustion engine operated in a low temperature combustion mode (such as the HCCI mode) can only be used part-time and the engine will have to have the capability to switch back to conventional combustion and the benefits of the low temperature combustion mode (or HCCI mode) will be lost during that period.

DETAILED DESCRIPTION OF THE PREFERRED EMBODIMENTS

Figure 1:
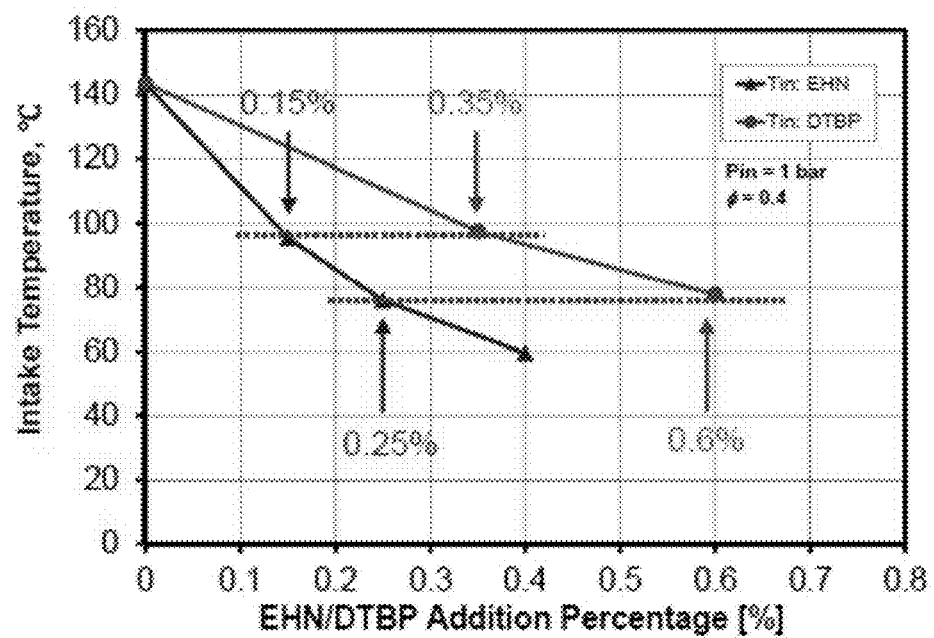
FIG. 1 is a graph illustrating the effect of a cetane improver to the intake temperature when added to a convention pump gasoline.

To facilitate the understanding of the subject matter disclosed herein, a number of terms, abbreviations or other shorthand as used herein are defined below. Any term, abbreviation or shorthand not defined is understood to have the ordinary meaning used by a skilled artisan contemporaneous with the submission of this application.

RON—The Research Octane Number is measured in a specially designed single cylinder CFR engine at an engine speed of 600 rpm and a specified intake air temperature that depends on barometric pressure. It reportedly simulates fuel performance under low severity engine operation.

Advanced Combustion Engines are defined as engines that produce ultra low $NO_x$ and low soot. An example of an Advanced Combustion Engine is an internal combustion engine operated in a homogeneous charge compression ignition mode.

Knock Limit is set as a safety margin to prevent the formation of severe pressure waves/oscillations in the engine cylinder, which typically results from high heat release and pressure rise rates. The knock limit is specified to ensure minimal engine vibration and noise levels (typically referred to as noise, vibration, and harshness, or NVH). Several different metrics are used to establish knock limits, including acoustic energy flux (in units of $MW/m^2$) and maximum pressure rise rate (in units of pressure/Crank Angle Degree). (See, e.g., SAE Technical Paper 2013-01-1658 by Maria et. al.).

Fuel Composition

The fuel compositions for use in the methods of present invention advantageously increase the knock limit when employed in an internal combustion engine operated in a low temperature combustion mode such as a homogeneous charge compression ignition mode. Preferably, the fuel composition is a gasoline-type fuel composition that is employed in a diesel-type engine under partially premixed combustion conditions. Furthermore, for certain fuel compositions of the present invention, reasonable maximum pressure rise rates are obtained, thus significantly expanding the range where the engine can be run under advanced combustion conditions satisfactorily.

The fuel composition employed in the present invention includes (a) gasoline having a Research Octane Number (RON) greater than 85 and (b) one or more cetane improvers. In one embodiment, the gasoline employed in the fuel composition has a RON greater than 85 and up to about 120. In another embodiment, the gasoline employed in the fuel composition has a RON greater than 89. In another embodiment, the gasoline employed in the fuel composition has a RON greater than 89 and up to about 120. If desired, the gasoline can contain other components such as, for example, ethanol in an amount up to about 85 vol. %. In one embodiment, the gasoline contains from about 0.5 up to about 20 vol. % ethanol.

Method of Making the Fuel Composition

The gasoline employed in the presently claimed invention was taken from a commercial refinery and in some cases ethanol was added. Information about typical processes and conditions for making these fuels can be found in "Petroleum Refining" by William Leffler (PennWell Corp, 2000).

Suitable cetane improvers include, but are not limited to, nitrogen-containing cetane improvers, nitrogen-free cetane improvers, and the like and mixtures thereof. Useful nitrogen-containing cetane improvers include nitrate-containing cetane improvers such as, for example, substituted or unsubstituted alkyl or cycloalkyl nitrates having up to about 12 carbon atoms, or from 2 to 10 carbon atoms, nitrate esters of alkoxy substituted aliphatic alcohols, and the like and mixtures thereof. The alkyl group may be either linear or branched.

Representative examples of alkyl nitrate compounds include, but are not limited to, methyl nitrate, ethyl nitrate, n-propyl nitrate, isopropyl nitrate, allyl nitrate, n-butyl nitrate, isobutyl nitrate, sec-butyl nitrate, tert-butyl nitrate, n-amyl nitrate, isoamyl nitrate, 2-amyl nitrate, 3-amyl nitrate, tert-amyl nitrate, n-hexyl nitrate, 2-ethylhexyl nitrate, n-heptyl nitrate, sec-heptyl nitrate, n-octyl nitrate, sec-octyl nitrate, n-nonyl nitrate, n-decyl nitrate, n-dodecyl nitrate, isomers thereof, and the like and mixtures thereof.

Representative examples of cycloalkyl nitrate compounds include, but are not limited to, cyclopentyl nitrate, cyclohexyl nitrate, methylcyclohexyl nitrate, cyclododecyl nitrate, isomers thereof and the like and mixtures thereof.

Representative examples of nitrate esters of alkoxy substituted aliphatic alcohols include, but are not limited to, 1-methoxypropyl-2-nitrate, 1-ethoxpropyl-2 nitrate, 1-isopropoxy-butyl nitrate, I-ethoxylbutyl nitrate and the like and mixtures thereof. Preparation of the nitrate esters may be accomplished by any of the commonly used methods: such as, for example, esterification of the appropriate alcohol, or reaction of a suitable alkyl halide with silver nitrate.

Useful nitrogen-free cetane improvers include organic compounds containing oxygen-oxygen bonds, such as alkyl peroxides, aryl peroxides, alky aryl peroxides, acyl peroxides, peroxy esters, peroxy ketones, per acids, hydroperoxides, and the like and mixtures thereof. Representative examples of nitrogen-free cetane improvers include, but are not limited to, di-tert-butyl peroxide, cumyl peroxide, 2,5-dimethyl-2,5-di(tertiary butylperoxy) hexane, tertiary butyl cumyl peroxide, benzoyl peroxide, tertiary butyl peracetate, 3,6,9-triethyl-3,9-trimethyl-1,4,7-triperoxononan, 2,2-di(teriary butyl) butane, peroxy acetic acid, tertiary butyl hydroperoxide and the like and mixtures thereof.

In general, the one or more cetane improvers will be added to the fuel composition in an amount ranging from about 0.1 to about 5 wt. %. In another embodiment, the one or more cetane improvers will be added to the fuel composition in an amount ranging from about 0.1 to about 1 wt. %.

In one embodiment, 2-ethylhexyl nitrate is present in the fuel composition in an amount ranging from about 0.05 to about 1 wt. %. In another embodiment. 2-ethylhexyl nitrate is present in the fuel composition in an amount ranging from 0.1 to about 0.5 wt. %.

In one embodiment, di-tert-butyl peroxide is present in the fuel composition in an amount ranging from about 0.1 to about 5 wt. %. In another embodiment, di-tert-butylperoxide is present in the fuel composition in an amount ranging from about 0.1 to about 2 wt. %.

In one embodiment, the cetane improver and gasoline are contained in separate storage vessels onboard the vehicle and the amount of cetane improver added to the fuel is varied, depending on the specific engine operating parameters such as speed, power level (load), boost pressure, and % EGR.

Engine

In the case of the low temperature combustion process such as the HCCI combustion process, during the homogeneous charge compression ignition mode of the operation, the ignition takes place in the entire combustion chamber almost simultaneously by an auto-ignition of the combustion mixture. The combustion is therefore not initiated by a locally limited ignition source (for example, a spark plug) but is determined only by the ignition conditions in the combustion chamber. The ignition conditions required for this purpose are ensured, for example, by the return of hot residual gas. Outside the homogeneous charge compression ignition mode, the combustion mixture is not ignited by auto-ignition, but by an active (external) igniting by means of an ignition system. The internal combustion engine for use herein can be any internal combustion engine which can operate in the homogeneous charge compression ignition mode. Engines not equipped with turbochargers or superchargers will typically operate at intake pressures of 100 kPa (unboosted, "naturally aspirated" operation). Engines equipped with single or multi-stage turbochargers and/or superchargers will operate from about 100 kPa to about 400 kPa, depending on the type and number of stages. The higher the boost pressure, the more expensive the engine system. In one embodiment, the engine will operate at an intake pressure of 100 kPa. In another embodiment, the engine will operate at an intake pressure of 130 kPa.

The following non-limiting examples are illustrative of the present invention.

COMPARATIVE EXAMPLE A

A "pump gasoline" containing 10 vol. % ethanol was used as a control. The main properties of the pump gasoline are listed in Table 1 below.

TABLE 1

| | |
|---|---|
| Specific Gravity (15° C.) | 0.7238 |
| Net Heating Value, MJ/kg | 41.74 |
| Carbon, wt. % | 81.67 |
| Hydrogen, wt. % | 14.72 |
| Oxygen, wt. % | 4.06 |
| RON | 92.5 |
| MON | 84.6 |
| Antiknock Index (R + M)/2 | 88.6 |

EXAMPLE 1

To the pump gasoline of Comparative Example A was added 0.15 wt. % of 2-ethylhexyl nitrate (EHN).

EXAMPLE 2

To the pump gasoline of Comparative Example A was added 0.25 wt. % of EHN.

EXAMPLE 3

To the pump gasoline of Comparative Example A was added 0.40 wt. % of EHN.

EXAMPLE 4

To the pump gasoline of Comparative Example A was added 0.35 wt. % of di-tert butyl peroxide (DTBP).

EXAMPLE 5

To the pump gasoline of Comparative Example A was added 0.60 wt. % of DTBP.

Engine Test

The fuel compositions of Examples 1-5 and Comparative Example A were tested to determine their high load limit in engines operated under advanced combustion conditions. The engine used was a single cylinder version of a 6-cylinder medium duty diesel engine in which 5 of the 6 cylinders were deactivated. The engine compression ratio was 14/1, and the engine speed was held constant at 1200 rpm. The fuel compositions of Examples 1-5 and Comparative Example A were each first premixed with air and then injected into the engine using a port fuel injector. Intake pressures ranged from 100 kPa (naturally aspirated conditions that are representative of most engines on the road) to 130 kPa (representative of some mildly "boosted" engines having turbochargers).

The effects of the cetane improver's concentration and type are shown in FIG. 1. As can be seen, the fuel composition of Comparative Example A required a relatively high intake temperature of 140° C. to initiate combustion. The high intake temperature is an indicator of its resistance to combust. For the fuel compositions of Examples 1-4, as the cetane improver concentration was increased, the intake temperature required to initiate combustion decreased significantly, indicating a significant improvement in reactivity. In particular, for EHN: (1) 0.15 wt. % EHN reduced the intake temperature to 95° C.; (2) 0.25 wt. % EHN reduced the intake temperature to about 78° C.; and (3) 0.40 wt. % EHN reduced the intake temperature to 60° C. (the lowest desirable intake temperature to ensure that the water in the recycled exhaust gas does not condense). For DTBP, (1) 0.35 wt. % DTBP reduced the intake temperature to 95° C. and (2) 0.6 wt. % DTBP reduced the intake temperature to about 78° C. Thus, EHN was more effective than DTBP for improving the gasoline reactivity.

Figure 2:
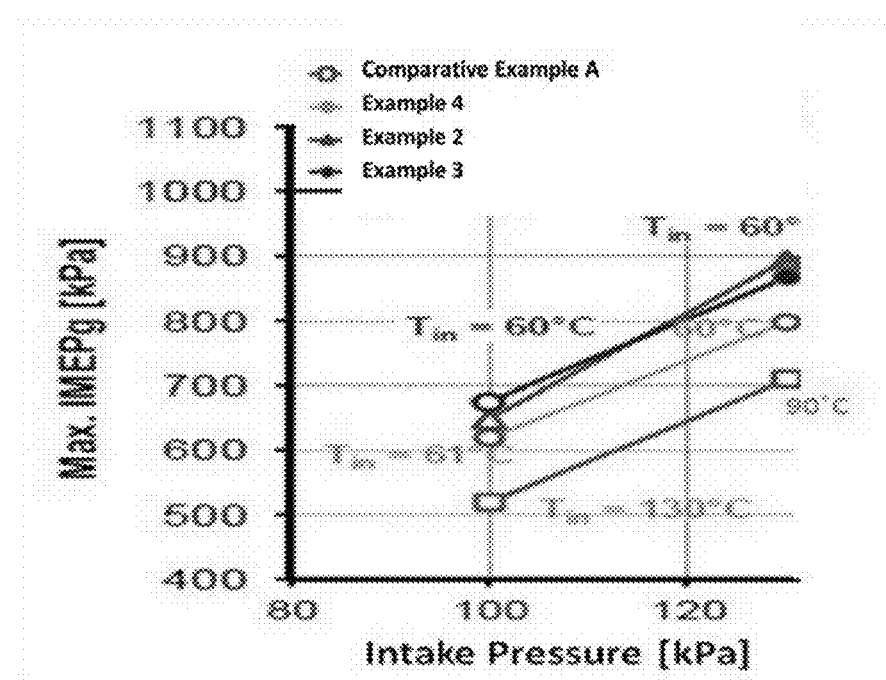
FIG. 2 is a graph illustrating the effect of a cetane improver on the high load limit (expressed in terms of maximum gross Indicated Mean Effective Pressure (IMEPg) vs. Intake Pressure) when added to a convention pump gasoline.

The impact of the cetane improvers on the high load knock limits of the engine were determined by increasing the fueling rate until the knocking of the engine exceeded acceptable ringing intensity limits of 3 MW/m$^2$ at 100 kPa intake pressure and 5 MW/m$^2$ at 130 kPa intake pressure. The results are shown in FIG. 2 where the high load knock limit (expressed in terms of maximum gross Indicated Mean Effective Pressure (IMEPg) vs. Intake Pressure) for the fuel compositions of Examples 1, 3 and 4 (i.e., 0.25 wt. % and 0.4 wt. % EHN and 0.35 wt. % DTBP (equivalent to EHN at 0.15 wt. %)) and Comparative Example A. At both 100 and 130 kPa, the high load knock limits of the fuel compositions of Examples 1, 3 and 4 were increased relative to the fuel composition of Comparative Example A (demonstrated by the lower values of Max. IMEPg for the fuel composition of Comparative Example A shown by the "squares"). Furthermore, the fuel composition of Comparative Example A required a high intake temperature of 130° C. just to have any combustion reactivity, while the fuel compositions of Examples 1, 3 and 4 only required an intake temperature of about 60° C.

As shown in FIG. 2, at 130 kPa, the reactivity of the fuel composition of Comparative Example A increased (as shown by a lower intake temperature requirement of 93° C.) and the high load limit increased. However, the fuel compositions of Examples 1, 3 and 4 continued to be more reactive and still have higher high load knock limits. The high load knock limits of the fuel compositions of Examples 1 and 3 having 0.25 and 0.4 wt. % EHN, respectively, were more than 28% higher than that of the fuel composition of Comparative Example A. The high load knock limit of the fuel composition of Example 4 having 0.35 wt. ° % DTBP (0.15% EHN equivalent) was intermediate between that of the fuels containing 0.25 and 0.4 wt. % EHN.

Figure 3A:
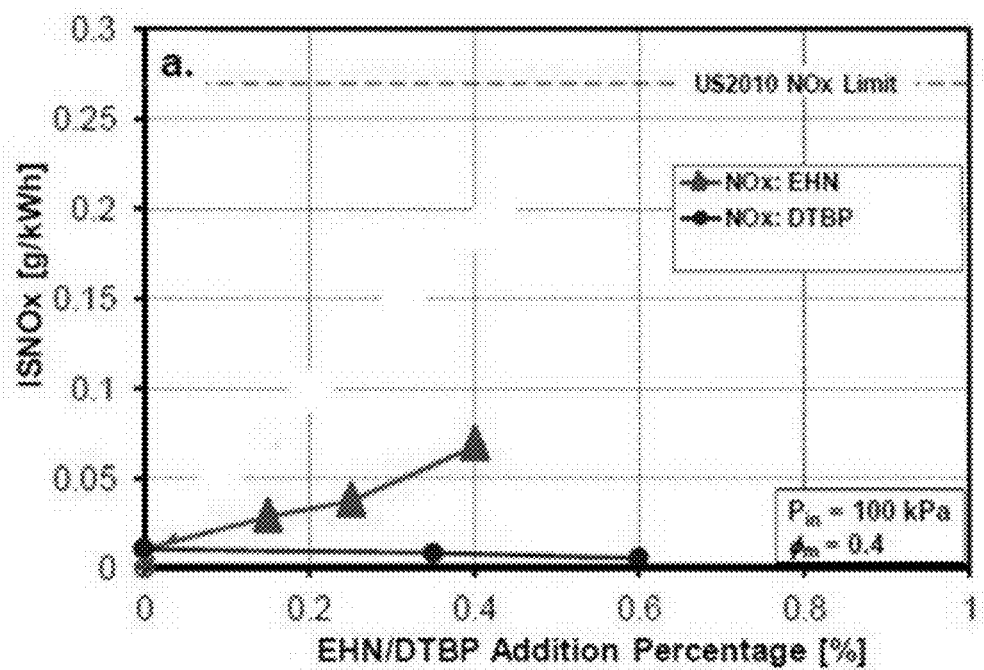
FIGS. 3a and 3b is a graph illustrating the effect of a cetane improver on the engine-out NOx emissions at 100 kPa intake pressure and 130 kPa intake pressure, respectively, when added to a convention pump gasoline.
Figure 3B:
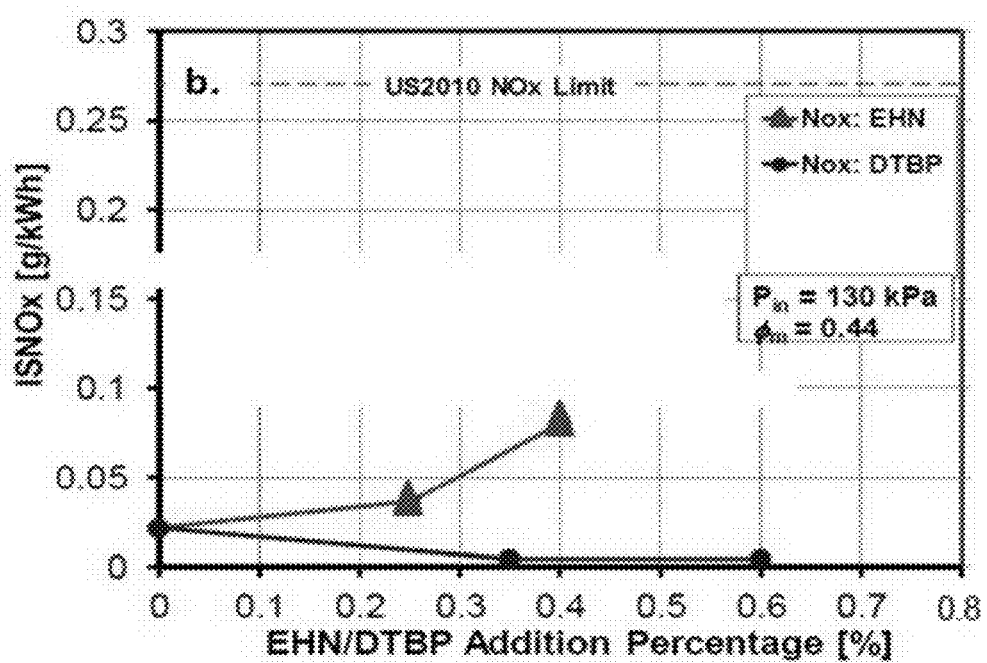

The NOx emissions were plotted in FIGS. 3a (100 kPa) and 3b (130 kPa) along with a line for the current US $NO_x$ limit (0.27 g/kWhr). For the fuel compositions of Examples 1-5 and Comparative Example A, the engine-out $NO_x$ emissions were each significantly lower than the requirements. This was achieved without the use of any NOx aftertreatment equipment and demonstrates that advanced combustion has been attained. As EHN concentration increased, the amount of NOx increased (most likely due to the presence of NO in the chemical structure of EHN). However, even at the highest EHN concentration, the NOx was still well below the US emission specifications. For DTBP, which does not contain NO in its chemical structure, the NOx did not increase with concentration.

The results of this invention clearly demonstrate the use of cetane improvers such as EHN and DTBP at relatively low concentrations can significantly increase the engine high load limits of "pump" gasoline and thus allows for the feasibility of the use of "pump" gasoline in advanced combustion engines.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A method for increasing the high load (knock) limit of an internal combustion engine operated in a low temperature combustion mode, the method comprising operating the engine with a fuel composition comprising (a) gasoline having a Research Octane Number (RON) greater than 85 and (b) one or more cetane improvers.

2. The method of claim 1, wherein the internal combustion engine is operated in a premixed charge compression ignition mode.

3. The method of claim 1, wherein the internal combustion engine is operated in a homogeneous charge compression ignition mode.

4. The method of claim 1, wherein the gasoline has a RON greater than 85 and up to about 120.

5. The method of claim 1, wherein the gasoline has a RON greater than 89.

6. The method of claim 1, wherein the gasoline contains ethanol up to 85 vol.

7. The method of claim 1, wherein the gasoline contains from about 0.5 up to about 20 vol. % ethanol.

8. The method of claim 1, wherein the one or more cetane improvers are selected from the group consisting of nitrogen-containing octane, improvers, nitrogen-free cetane improvers, and mixtures thereof.

9. The method of claim 8, wherein the nitrogen-containing cetane improvers are nitrate-containing cetane improvers.

10. The method of claim 9, wherein the nitrate-containing cetane improvers are selected from the group consisting of substituted or unsubstantial alkyl nitrates, substituted or substituted cycloalkyl nitrates, nitrate esters of alkoxy substituted aliphatic alcohols, and mixtures thereof.

11. The method of claim 10, wherein the alkyl nitrate compounds are selected from the group consisting of methyl nitrate, ethyl nitrate, n-propyl nitrate, isopropyl nitrate; allyl nitrate, n-butyl nitrate, isobutyl nitrate, sec-butyl nitrate, tert-butyl nitrate, n-amyl nitrate, isoamyl nitrate, 2-amyl nitrate, 3-amyl nitrate, tert-amyl nitrate, n-hexyl nitrate, 2-ethylhexyl nitrate, n-heptyl nitrate, sec-heptyl nitrate, n-octyl nitrate, sec-octyl nitrate, n-nonyl nitrate, n-decyl nitrate, n-dodecyl nitrate, isomers thereof and mixtures thereof.

12. The method of claim 11, wherein the cycloalkyl nitrate compounds are selected from the group consisting of cyclopentyl nitrate, cyclohexyl nitrate, methylcyclohexyl nitrate, cyclododecyl nitrate, isomers thereof and mixtures thereof.

13. The method of claim 11, wherein the nitrate esters of alkoxy substituted aliphatic alcohols are selected from the group consisting of 1-methoxypropyl-2-nitrate, ethoxypropyl-2 nitrate, 1-isopropoxy-butyl nitrate, 1-ethoxylbutyl nitrate and mixtures thereof.

14. The method of claim 8, wherein the nitrogen-free cetane improvers are selected from the group consisting of alkyl peroxides, aryl peroxides, alky aryl peroxides, acyl peroxides, peroxy esters, peroxy ketones, per acids, hydroperoxides and mixtures thereof.

15. The method of claim 8, wherein the nitrogen-free cetane improvers are selected from the group consisting of di-tert-butyl peroxide, cumyl peroxide, 2,5-dimethyl-2,5-di(tertiary butylperoxy) hexane, tertiary butyl cumyl peroxide, benzoyl peroxide, tertiary butyl peracetate, 3,6,9-triethyl-3,9-trimethyl-1,4,7-triperoxononan, 2,2-di(tertiary butyl) butane, peroxy acetic acid, tertiary butyl hydroperoxide and mixtures thereof.

16. The method of claim 1, wherein the one or more cetane improvers is 2-ethylhexyl nitrate.

17. The method of claim 1, wherein the one or more cetane improvers is di-tert-butyl peroxide.

18. The method of claim 1, wherein the one or more octane improvers are present in the fuel composition in an amount ranging from about 0.05 to about 5 wt. %.

19. The method of claim 16, wherein 2-ethylhexyl nitrate is present in the fuel composition in an amount ranging from about 0.05 to about 1 wt. %.

20. The method of claim 16, wherein 2-ethylhexyl nitrate is present in the fuel composition in an amount ranging from 0.1 to about 0.5 wt. %.

21. The method of claim 17, wherein di-tert-butyl peroxide is present in the fuel composition in an amount ranging from about 0.1 to about 5 wt. %.

22. The method of claim 17, wherein di-tert-butylperoxide is present in the fuel composition in an amount ranging from about 0.1 to about 2 wt. %.

23. The method of claim 1, wherein the amount of the one or more cetane improvers added to the fuel during engine operation is dependent on one or more of engine speed, power output (load), boost level, or % EGR.

24. The method of claim 1, wherein the internal combustion engine is operated at an intake pressure of 100 kPa.

25. The method of claim 1, wherein the internal combustion engine is operated at an intake pressure of 130 kPa.

26. The method of claim 1, wherein the gasoline has a RON greater than 92.5.

27. The method of claim 1, wherein the gasoline has a RON greater than 925 and up to about 120.

* * * * *